United States Patent [19]

Pinschmidt, Jr. et al.

[11] Patent Number: 4,931,194

[45] Date of Patent: Jun. 5, 1990

[54] ENHANCED OIL RECOVERY WITH HIGH MOLECULAR WEIGHT POLYVINYLAMINE FORMED IN-SITU

[76] Inventors: Robert K. Pinschmidt, Jr., 1033 N. Glenwood St., Allentown, Pa. 18104; Ta-Wang Lai, 401 Ignacio Blvd., Apt. 133, Novato, Calif. 94949

[21] Appl. No.: 295,183

[22] Filed: Jan. 9, 1989

Related U.S. Application Data

[63] Continuation-in-part of Ser. No. 164,158, Mar. 4, 1988, Pat. No. 4,828,725, which is a continuation-in-part of Ser. No. 914,046, Oct. 1, 1986, abandoned.

[51] Int. Cl.$^5$ .............................................. E21B 43/22
[52] U.S. Cl. .................................... 252/8.551; 166/270; 166/274; 166/275
[58] Field of Search ............... 252/8.551, 8.553, 8.554; 166/270, 274, 275

[56] References Cited

U.S. PATENT DOCUMENTS

| | | | |
|---|---|---|---|
| 4,046,197 | 9/1977 | Gruesbeck, Jr. et al. | 166/305 R X |
| 4,060,490 | 11/1977 | Bernard | 252/8.55 D |
| 4,217,214 | 8/1980 | Dubin | 210/52 |
| 4,366,074 | 12/1982 | McLaughlin et al. | 252/8.55 R |
| 4,432,881 | 2/1984 | Evani | 252/8.5 A |
| 4,444,667 | 4/1984 | Burkert et al. | 210/735 |
| 4,471,097 | 9/1984 | Uhl et al. | 526/240 X |
| 4,490,261 | 12/1984 | Heilweil | 252/8.5 A |
| 4,500,437 | 2/1985 | Engelhardt et al. | 252/8.55 |
| 4,619,773 | 10/1986 | Heilweil et al. | 252/8.514 |
| 4,623,699 | 11/1986 | Brunnmueller et al. | 525/355 |
| 4,626,363 | 12/1986 | Gleason et al. | 252/8.514 |
| 4,699,722 | 10/1987 | Dymond et al. | 252/8.551 |
| 4,795,575 | 1/1989 | Southwick et al. | 252/8.554 |

FOREIGN PATENT DOCUMENTS 0120592 of 1984 European Pat. Off. .

*Primary Examiner*—John F. Terapane
*Assistant Examiner*—Chhaya Sayala
*Attorney, Agent, or Firm*—Mark L. Rodgers; William F. Marsh; James C. Simmons

[57] ABSTRACT

The recovery of oil or gas from underground porous formations bearing such hydrocarbons is enhanced by using an injection fluid containing a viscosifying amount of a poly(vinylamine) formed in-situ by hydrolysis of a high molecular weight poly(N-vinylamide). The hydrolysis conditions are strongly acidic or highly alkaline and include the elevated temperature of the formation.

The poly(N-vinylamide), such as poly(N-vinylformamide), can be made by inverse emulsion polymerization and the high solids emulsion mixed directly with the acidic or basic solutions to form the injection fluid.

The process is applicable to enhanced oil recovery using fluids for water-flooding, well completion or workover, and acidifying or fracturing.

15 Claims, No Drawings

ENHANCED OIL RECOVERY WITH HIGH MOLECULAR WEIGHT POLYVINYLAMINE FORMED IN-SITU

CROSS REFERENCE TO RELATED APPLICATIONS

This application is a continuation-in-part of copending application Ser. No. 164,158 filed Mar. 4, 1988 now issued as U.S. Pat. No. 4,828,725; which in turn, is a continuation-in-part of copending application Ser. No. 914,046 filed Oct. 1, 1986 abandoned.

TECHNICAL FIELD

This invention relates to a process for enhancing the recovery of oil or gas from an underground formation by the use of fluids containing high molecular weight poly(vinylamines) formed in-situ.

BACKGROUND OF THE INVENTION

The recovery of oil or gas from natural occurrence in underground porous formations can be enhanced in a number of ways using injection fluids. Some injection fluids are forced into the production well to increase porosity of the surrounding formation, either by fracturing or acidizing the formation immediately surrounding the well. Oil recovery can also be enhanced by water flooding in which a salt solution, forced into an injection well, permeates the oil bearing formation and flows ultimately through a production well carrying with it the residual oil from the formation. Completion fluids are frequently used to maximize the recovery of oil from existing reservoirs. Such completion fluids are placed across a production zone during completion or workover of a well in order to maintain hole stability and control subsurface pressures.

In injection fluids, whether for water flooding, well completion, fracturing or acidizing, in order to minimize the flow and the loss of the fluid down cracks in the rock formation, it is desirable to add a viscosifier. A commonly used viscosifier is guar or carboxylmethyl cellulose (CMC), but in the search for improved viscosifiers, polymeric materials have found increasing favor because they can be tailored to be hydrolytically stable under the conditions that prevail in the formation, including elevated temperatures.

As described in our copending application Ser. No. 164,158, a viscosifier which has shown many advantages and is particularly stable under the conditions that prevail in underground oil producing formations, is a high molecular weight poly(vinylamine) or its acid salt. This polymer has advantages over standard polymers used as viscosifiers. For example, polyacrylamide, which rapidly hydrolyzes under acid or base conditions to give polyacrylic acid functionality, precipitates due to crosslinking by polyvalent cations (calcium, magnesium, aluminum). Guar gum or xanthan gum, which are natural polysaccharides also used as viscosifiers, undergo rapid hydrolysis to low molecular weight species at elevated temperatures, particularly in acid conditions. Poly(vinylamine), on the other hand, especially the high molecular weight polymer, shows good thermal stability in strong acid or base conditions while serving as a viscosifier. This polymer, however, when available as a dry powder, because of its high molecular weight, dissolves slowly and only with continuous agitation and, preferably, heat to give a dilute solution acceptable for acid or alkaline flooding or other injection fluid use. These dissolution steps are time consuming and add greatly to the cost of using the poly(vinylamine) as a viscosifier in injection fluids. If dissolved at the well, mixing equipment and storage vessels are required on site. On the other hand, if the dissolution is performed at a plant where such equipment exists, then large volumes of the solution must be transported to the field thereby contributing to increased cost.

Poly(vinylamine) can be prepared by polymerizing the vinylamide in water or preferably in a water-in-oil inverse emulsion to provide a high solids content emulsion. In order to maintain a reasonable viscosity, the polymer is then hydrolyzed under acid or base conditions as a very dilute solution in water. The polymer can then be acidified to give the acid salt and precipitated from water with several additional volumes of a solvent such as methanol The precipitated polymer, collected as a stringy solid, is ground to a powder and then transported to its point of use.

U.S. Pat. No. 4,623,699 (1986) discloses a method of hydrolyzing poly-(N-vinylformamide) powder at elevated temperatures with gaseous hydrogen chloride or hydrogen bromide. The poly(vinylamines) prepared are said to be useful, for example, as flocculants for wastewaters and sludges, or as retention agents, drainage agents and as flocculants in papermaking. This process, however, produces incomplete polymer hydrolysis, especially if the molecular weight of the polymer is high, as is desired for use as a viscosifier in injection fluids for enhanced oil recovery. This process also requires use of expensive equipment designed to minimize acid halide corrosion and has long process cycles.

U.S. Pat. No. 4,444,667 (1984) also discloses the use of poly(vinylamines) as a flocculating agent in sludges where the poly(vinylamine) is prepared by the hydrolysis of from 10 to 90% of the formyl groups in a poly-(N-vinylformamide).

U.S. Pat. No. 4,699,722 (1987) describes well workover fluids which contain a polymer viscosifier, such as a polymer of dimethylaminopropylmethacrylamide and copolymers which contain not over 50% comonomer.

European Patent Application Publ. No. 0120592 discloses stabilizing fines in permeable subterranean formations with certain organic polycationic polymers containing two quarternary ammonium moieties in the repeating unit.

U.S. Pat. No. 4,217,214 (1980) discloses that poly(vinylamine) hydrochloride is useful as a flocculating agent in wastewater systems.

U.S. Pat. No. 4,500,437 (1985) discloses acrylamide copolymers and terpolymers containing N-vinylformamide and N-vinylacetamide which are useful as friction reducers in acid stimulation of oil or gas wells. These polymers are said to have molecular weights ranging from 20,000 to $15 \times 10^6$ and can be introduced into the acid solution for fracture-acidizing as an oil-in water or water-in-oil emulsion. In Examples 67–70, the polymers are prepared by inverse emulsion polymerization with the polymers of Examples 68 and 70 having molecular weights well below 100,000. Example 20 shows the preparation of poly(N-vinylformamide) by solution polymerization.

None of the above cited references address the problems associated with the dissolution of poly(vinylamine) viscosifiers of high molecular weight when it is intended to use such polymers in injection fluids for enhanced oil or gas recovery.

SUMMARY OF THE INVENTION

According to the present invention, the above problems are overcome by forming the poly(vinylamine) in-situ in the underground formation under either strongly acidic or strongly basic conditions and at the elevated temperatures which prevail in the formation. The in-situ formation of the poly(vinylamine) is accomplished by hydrolyzing a poly(N-vinylamide), which in turn can be prepared in an aqueous phase polymerization, but preferably in a water-in-oil inverse emulsion polymerization.

The recovery of oil or gas from the porous underground formation which bears the hydrocarbon, is accomplished by injecting into the formation an aqueous fluid containing a high molecular weight, poly(N-vinylamide), and then subjecting this poly(N-vinylamide) within the formation to strongly acidic or strongly basic hydrolyzing conditions, thereby to convert the poly(N-vinylamide) in-situ to a poly(vinylamine) in sufficient concentration to serve as a viscosifying agent in the aqueous fluid. Although it is preferred that the poly(N-vinylamide) be essentially unhydrolyzed prior to injection into the formation, a polymer which has hydrolyzed less than 90% to the vinylamine units, can be used and the remaining hydrolysis converts most of the remaining amide moieties to amine units. The poly(N-vinylamide) can be dissolved from its solid form into water or aqueous acid or alkali solutions and then mixed with the injection fluid. Preferably, however, the polymer is used in its water-in-oil emulsion form resulting from inverse emulsion polymerization. The poly(N-vinylformamide) in the injection fluid, when exposed to the highly acidic or strongly basic conditions under the elevated temperature in the underground formation, undergoes in-situ hydrolysis to the desired poly(vinylamine).

The substantially unhydrolyzed poly(N-vinylamide) is much less viscous in the injection fluid than the corresponding poly(vinylamine) formed when hydrolysis is complete. Consequently, by injecting the polymer into the formation in the amide form, the polymer is subjected to less shear degradation which causes a reduction of polymer molecular weight and lowers its effectiveness as a viscosifying agent.

DETAILED DESCRIPTION OF THE INVENTION

The poly(N-vinylamides) which are preferred for conversion by in-situ hydrolysis to poly(vinylamines) in accordance with this invention are homopolymers or copolymers of monomers having the formula:

wherein R is H or methyl, and $R^1$ and $R^2$ are each H, alkyl, alkoxy or hydroxyalkyl containing 1 to 4 carbon atoms, or $R^1$ and $R^2$ together form an alkylene group containing 2 to 5 carbon atoms. Included among these polymers are the poly(N-vinylformamides) which are most preferred, as well as their N-substituted derivatives, for example, the derivatives substituted with methyl, ethyl, propyl, hydroxyethyl, hydroxypropyl and the like. Also included are the poly-(N-isopropenyl-formamides) and the higher poly-(N-vinylamides), with or without N-alkyl substitution, such as poly-(N-vinylacetamide) and poly-(N-vinyl-N-methylacetamide). The cyclic amides such as poly(N-vinylpyrrolidone) and other polyvinyllactams can also be used, although they hydrolyze to the poly(vinylamines) with more difficulty, as can certain halogenated derivatives which do not interfere with the hydrolysis, such as poly(N-vinyltrifluoroacetamide).

Other polymers included when $R^2$ is alkoxy are the poly(N-vinyl-O-alkylcarbamates) with or without additional N-alkyl substitution), especially where the O-alkyl substituent is a tertiary alkyl substituent, for example O-t-butyl. If is necessary, however, that the polyamide or carbamate polymers hydrolyze to amine functionality under the conditions which prevail in the formation. These polymers can be homopolymers or copolymers with monomers of the same type and may contain minor amounts of other comonomers which give the necessary water solubility for acid and base stability, such as vinyl acetate which would hydrolyze to the vinyl alcohol, and vinyl ethers or minor amounts of more hydrophobic monomers such as styrene or vinyl chloride. Acrylamide should be avoided as a comonomer because of the tendancy of acrylamide polymers to precipitate in the presence of calcium, magnesium or barium ions. Poly(N-acylethyleneimines), especially where the acyl substituent is formyl, acetyl, or propionyl, likewise undergo hydrolysis under these in-situ conditions.

The injection fluid in the formation is either highly basic or highly alkaline and preferably has pH value of about 2 or less or about 12 or more. Most commonly these solutions contain hydrogen chloride or sodium hydroxide, but other acids and bases such as hydrogen bromide, hydrogen fluoride, lithium hydroxide or potassium hydroxide and the like can be used. Higher valent acids such as sulfuric or phosphoric acids are possible for use, but could produce gelation. High valent bases, such as calcium or magnesium hydroxide will work, but could also produce undesired gelation in rock formations containing carbonates. Strong organic acids are effective but would increase costs unnecessarily.

The poly(N-vinylamide) has a high molecular weight which is greater than 100,000 and can be as high as 15 million. Preferably the polymer has an average molecular weight of at least 500,000 and better results as a viscosifier are obtained when the poly(N-vinyamide) which is to be hydrolyzed has an average molecular weight in the range of 1.3 to $15 \times 10^6$. It is preferred that this polymer have an average molecular weight in the range of 1.8 to $9 \times 10^6$. Molecular weights referred to are weight average molecular weights and can be determined by a number of methods which produce approximately the same order of magnitude results, such as gel permeation chromatography, intrinsic viscosity measurements, aqueous gel permeation chromatography, or light scattering.

The concentration of the poly(N-vinylamide) in the injection fluid where the hydrolysis to the poly(vinylamine) takes place can be in the range from 0.1 to 10 wt. %, but preferably is from 0.1 to 2 wt %. For example, a typical completion fluid formed in-situ is a saturated salt solution containing 0.2 to 2 wt %, preferably 0.5 to 2 wt %, poly(vinylamine). These completion fluids which are suitable for oil field use exhibit high viscosity in saturated brine solution, as well as high temperature viscosity stability. Solution rheology (thickening efficiency and viscosity response to shear rates in the range of 1 to 1,000 sec$^{-1}$) of the poly(vinylamines) at a 0.5 to 1% concentration in low level salt solutions, for example 2 wt % potassium chloride solution, is important in oil field chemical compositions for many applications. The high molecular weight polymers afford better viscosifying of fluids which are used in oil and gas production and injection wells.

The acid or base, which is preferably HCl or NaOH, is at a concentration such that the molar amount present is sufficient to hydrolyze at least 30% of the amide groups present in the polymer. Preferably the acid or base is present in an amount sufficient to provide stoichiometric hydrolysis of the amide groups to amine units and can be present in concentrations up to 15 to 30 wt % based on the amount of aqueous solution.

While a formation temperature as low as 15° C. would be feasible and the hydrolysis generally occurs between 20 to 200° C., it is more practicable to use temperatures of at least 40° C. up to over 100° C., and temperatures as high as 140° or 150° C. are operable for the hydrolysis conversion of the poly(N-vinylamide). The polymer is definitely more stable at these higher temperatures in the absence of oxygen. Also, the poly(N-vinylamide) and poly(vinylamine) which is formed by hydrolysis is more stable under acid flooding conditions than alkaline conditions because of a higher effective viscosity and stability when protonated. Hydrolysis of polyamides other than the formamides, for example the poly(N-vinylacetamide), requires, in general, more vigorous conditions, for example, 100° C. with excess hydrogen chloride for acid hydrolysis and as high 150° C. for alkaline hydrolysis. Milder conditions are operable for the poly(N-vinylformamide).

With poly(N-vinylformamide), the highest molecular weight polymer is made most readily in water, either by solution or inverse emulsion polymerization. This polymer undergoes very ready hydrolysis in water on heating with stoichiometric or excess acid or base. The polyionomer produced, particularly under acid conditions, has desirably high viscosity in dilute solution in the presence of concentrated acid and resists thermal and acid catalyzed degradation. Unlike partially hydrolyzed polyacrylamide, this polymer does not form insoluble gels in the presence of divalent cations, such as calcium, magnesium and barium.

The method for preparing the inverse, or water-in-oil, emulsion involves colloidally dispersing an aqueous solution containing 10-90 wt % water-soluble N-vinylamide in the hydrocarbon liquid using a surfactant having an HLB value from 4 to 9, the weight ratio of monomer-containing aqueous solution to hydrocarbon liquid being preferably in the range from 1:2 to 2:1, and polymerizing the monomer using an azo-type free radical initiator.

The resultant very high molecular weight polymer emulsion has a low viscosity ranging from 2 to less than 10 cps at 15% solids, 60 rpm Brookfield and 20° C., thus eliminating problems of solution viscosity which arise when the polymer is prepared by a solution polymerization process. In addition, the low viscosity homopolymer emulsion is easy to handle and can be used directly.

Poly(N-vinylamides) of molecular weight at least 10$^6$, preferably $3 \times 10^6$ to $15 \times 10^6$, are prepared via an inverse emulsion polymerization process by reacting the following composition under an inert atmosphere: 1. water-soluble N-vinylamide monomer, 2. water, 3. hydrocarbon liquid, 4. water-in-oil emulsifying agent, and 5. a nitrogen-containing free radical initiator.

The aqueous solution comprising the first two components contains 10 to 90 wt %, preferably 50 to 70 wt %, of a water-soluble N-vinylamide of the formula

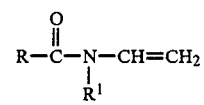

where R and R$^1$ represent hydrogen or an alkyl group having 1-4, preferably 1-2, carbon atoms, especially a methyl group. The weight ratio of monomer-containing aqueous solution to hydrocarbon liquid may be varied widely depending upon the monomer used, but preferably is about 1:2 to 2:1.

The suitable hydrocarbon liquids for use in the polymerization are immiscible with water and do not significantly dissolve the monomers in the presence of water. Such hydrocarbon liquids are exemplified by acyclic and cyclic $C_5$–$C_{10}$ alkanes such as hexane, octane, decane, and decahydronaphthalene (decalin) and, in addition, certain aromatic hydrocarbons for N-vinylacetamides and the aromatic hydrocarbons toluene and xylene. Contemplated as the functional equivalent of toluene and xylene when R is an alkyl group in the monomer formula are ethylbenzene and tetrahydronaphthalene (tetralin). The preferred hydrocarbon liquids are the $C_5$–$C_{10}$ acyclic alkanes.

The stabilizing system comprises suitable emulsifying agents, or surfactants, having a hydrophilic-lipophilic balance (HLB) value from 4 to 9, preferably 4 to 7.5, and include sorbitan fatty acid esters such as sorbitan monostearate, oleate, laurate or palmitate; polyoxyethylenesorbitan fatty acid esters, i.e. reaction products of one mole of the aforementioned sorbitan fatty acid esters with from 4 to 40 moles of ethylene oxide; polyoxyethylene sorbitol esters of fatty acids; and mixtures thereof. The preferable quantity of surfactant is 5 to 20 wt % based on the monomer-containing aqueous solution.

The free radical initiator should be one of the azo compounds well known in the polymerization art such as 2,2'-azobis(isobutyronitrile); 2,2'-azobis(2-amidinopropane) hydrochloride; 4,4'-azobis(4'-cyanopentanoic acid) and the like. Persulfates and hydrogen peroxide have been found not to be suitable in practicing the invention. Redox catalyst systems may also be used comprising peroxide initiators with a reducing agent typically used in the art. The amount of free radical initiator can be varied widely depending upon reaction temperatures, rate of polymerization, degree of polymerization to be obtained, but preferably is in the range of 0.001 to 0.5 mole % of the monomer used.

The polymerization is usually carried out under an inert atmosphere, preferably under nitrogen. The reaction temperature is preferably in the range of 40°-60° C. A high temperature, i.e. >60° C., may cause side reactions unfavorable to the polymer such as crosslinking or chain transfer. A lower temperature may be impractical because of long reaction times.

The homopolymer product can be isolated from the emulsion by adding a flocculating agent and filtering. The precipitated product is then washed and dried. Generally, a polar organic solvent which is a good solvent for the surfactant but a poor solvent for the polymer, e.g. acetone, is used to aggregate the polymer. The precipitated polymer is filtered and washed to remove the surfactant. The dried and purified polymer of very high molecular weight is in the form of a fine powder and is water soluble.

Although the invention can be practiced with a poly(N-vinylamide) which is already partially hydrolyzed, it is preferred to use a polymer which is essentially unhydrolyzed prior to contacting the formation. For example, the polymer ideally has less than 10% of the amide units in the poly(N-vinylamide) hydrolyzed to the amine groups prior to injecting the fluid into the formation. Even so, it is possible to obtain benefits from the invention by injecting into the formation, for example, an aqueous salt solution containing about 0.2 to 2 wt. % of a poly(N-vinylamide) having an average molecular weight of at least $10^6$ and less than 90% of the amide groups hydrolyzed to amine units, and then subjecting the poly(N-vinylamide) within the formation to the strongly acidic or strongly basic hydrolyzing conditions to convert most of the remaining amide units to amine groups. The advantage of in-situ hydrolysis, however, is enjoyed to a greater extent if less than 50% of the amide units have already been hydrolyzed to the amine groups before entering the formation. Ideally the poly(N-vinylamide) is obtained directly from inverse emulsion polymerization so that it is present as a high solids water-in-oil emulsion. For example, the polymer solids content in such emulsions can be as high as 50 wt % or higher.

In enhanced oil recovery (EOR) applications, the poly(vinylamines) which are produced by hydrolysis, provide compositions having improved viscosity stability at 90° C. and improved viscosity retention in sea water. Most commercially available polymers fail under both these conditions. Hydrolyzed polyacrylamides fail in sea water solution at elevated temperatures due to precipitation of polymer in the presence of calcium ions in the sea water. Xanthan polymer is insensitive to calcium ions, but at high temperatures, especially in acid, the polymer chains hydrolyze and lose their viscosifying efficiency.

In general, such enhanced oil recovery compositions could include sea water containing about 1,000 to 2,000 ppm of the poly(vinylamine) and have a 10 to 20 cps Brookfield viscosity at 7.9 sec$^{-1}$ (60 rpm) and 90° C. The very high molecular weight poly(vinylamines) show improved stability at a high temperature and calcium salinity, a set of conditions useful in high temperature EOR viscosifying applications.

When used in acidized fracturing fluids, the poly(vinylamine) results in improved viscosity stability in concentrated hydrochloric acid at 70° C. Most commercial cellulosic polymers currently used in this application fail because of breakdown of the polymer backbone under these conditions. Such fluids can comprise about 0.2 to 2% poly(vinylamine) and 5 to 28% aqueous hydrochloric acid and have a FANN 35 viscosity of 10 to 100 cps at 300 rpm, 510 sec$^{-1}$ and $R_1B_1$ sensor. When the injection fluid is used in a process for well stimulation by fracture acidizing with an aqueous acidic solution under pressure sufficient to fracture the formation, the viscosifying poly(vinylamine) should have a molecular weight greater than $10^6$.

EXAMPLE 1

This example illustrates the formation of a poly(N-vinylamide), specifically poly(N-vinylformamide) by inverse emulsion polymerization. Sorbitan monostearate, Span 60 surfactant, (75 g) was dissolved in octane (2700 g), and the resulting solution was transferred into a reaction kettle. The reactor was purged with nitrogen and kept in a nitrogen atmosphere throughout the polymerization. A solution of N-vinylformamide in water (450 g in 900 g of $H_2O$) was degassed and added to the reactor at a rate of 20 ml/min with vigorous agitation. While the reaction mixture was heated to 50° C., 2,2'-azobis(2,4-dimethylpentanenitrile), Vazo 52 initiator, (1.5 g) was charged. After 3 hours at 50° C. with agitation, a blue-gray, translucent, stable polymeric latex was produced.

In order to isolate the polymer for molecular weight and viscosity measurements, the solid polymer product was recovered by breaking the emulsion by addition of acetone. The isolated polymer had a molecular weight of about $7 \times 10^6$, and a viscosity of 21,000 cps at a concentration of 5% in $H_2O$.

EXAMPLE 2

This example shows the hydrolysis of poly(N-vinylformamide) under simulated down-hole conditions including acidizing and alkaline flooding. A saline solution with 1.5% $CaCl_2$, 0.9% $MgCl_2$, 5% NaCl and 0.1% poly(N-vinylformamide) was prepared. (proportions are in weight percent unless otherwise indicated.) The pH of the resulting aqueous mixture was adjusted accordingly with HCl or NaOH solution, and the mixture was heated at 100° C. for 5 hours. The hydrolyzed polymers were recovered by dialysis, followed by precipitation from acetone, and then analyzed by NMR to determine the degree of hydrolysis. The results are illustrated in Table 1.

TABLE 1

| SOLUTION PH | % HYDROLYSIS |
| --- | --- |
| 2 | 100 |
| 3 | Nil |
| 5 | Nil |
| 7 | Nil |
| 9 | Nil |
| 11 | Nil |
| 11.5 | 10 |
| 12 | 100 |

The above data show that under the simulated formation conditions, including time and temperature, the pH for effective hydrolysis of the polymer should be about 2 or below or about 12 or above.

EXAMPLE 3

This example illustrates the difficulty associated with hydrolysis of poly-N-formamide under non-in-situ conditions in order to form the poly(vinylamine), when not proceeding in accordance with our invention. Because of extremely high solution viscosity, hydrolysis of poly(N-vinylformamide) was performed by using a dilute aqueous solution of the polymer to prevent unnecessary mechanical degradation of the polymer. Thus, poly(N-vinylformamide) (10 g) prepared by inverse emulsion polymerization was dissolved in water (990 g) and then mixed with 50% aqueous sodium hydroxide (11.3 g). The resulting viscous mixture was heated for 8 hours at 80° C. under a nitrogen atmosphere. To the reaction mixture was added concentrated hydrochloric acid ( ~6 equivalents on poly(vinylamine) until the polymer precipitated. The acid solution was decanted. The wet, thick sticky polymer mass was redissolved in water and reprecipitated with methanol. The dried poly(vinylamine ·HCl) hydrated slowly in water because of its high molecular weight. Normally, one day is required to prepare a 1% polymer solution. This polymer solution had a viscosity of 400 cps.

EXAMPLE 4

Very high, $7 \times 10^6$, and lower, $6 \times 10^5$, molecular weight poly(vinylamines), PVAm, were compared with guar gum having a molecular weight of about $2 \times 10^6$ for use in a fracture-acidizing composition. The polymer concentration was 0.5% and the viscosity was measured using a Fann 35 viscometer, 300 rpm, $R_1B_1$ sensor at 510 $sec^{-1}$ for various acid concentrations and at different temperatures and time intervals. Results in cps viscosity units are shown in Table 2.

TABLE 2

| | ROOM TEMPERATURE | | | 70° C. - 3 HOURS | | |
|---|---|---|---|---|---|---|
| % HCl | PVAm (0.6 MM) | PVAm (7 MM) | guar | PVAm (0.6 MM) | PVAm (7 MM) | guar |
| 0 | 28 | 129 | 37 | 18 | 68 | 34 |
| 10 | 10 | 22 | 26 | 3 | 12.5 | 2 |
| 15 | 6 | 6.5 | 11 | 2 | 9 | 2 |

The $7 \times 10^6$ molecular weight poly(vinylamine) had higher viscosity than the low molecular weight homopolymer. Although initially only comparable or inferior to the guar gum control under acid conditions and at room temperature, the high molecular weight poly(vinylamine) outperformed guar at high temperature where the guar rapidly hydrolyzed to low molecular weight species. The poly(vinylamine) in contrast showed good hydrolytic stability at high temperature in high acid solution. In other tests in 5% HCl solution over temperatures from 25° C. to 80° C., the viscosity of poly(vinylamine) decreased with increasing temperature, but was not degraded. The original viscosity was restored after cooling to room temperature.

EXAMPLE 5

This example shows the application of a poly(vinylamine) in enhanced oil recovery. Two vinylamine homopolymers and two commercially available polymers, namely xanthan and a hydrolyzed polyacrylamide were evaluated at ppm in sea water using a low shear Brookfield viscosity at 7.9 $sec^{-1}$.

TABLE 3

| Low Shear Rheology in Sea Water[a] | | | |
|---|---|---|---|
| | | Brookfield Viscosity (cps)[b] | |
| Polymer | Conc (ppm) | R.T. | 90° C. |
| Vinylamine (7 MM) | 1500 | 16 | 13 |
| Vinylamine (0.6 MM) | 1500 | 6 | 2 |
| Xanthan SC | 1500 | 50 | 4 |
| Hydrolyzed Polyacrylamide | 1500 | 15 | 3 |

[a]Sea Water = 3% NaCl + 0.3% CaCl$_2$; pH = 6
[b]Model LVF, 7.9 $sec^{-1}$

It can be seen from the above data that the vinylamine homopolymer of about $7 \times 10^6$ molecular weight outperformed the commercially available polymers as well as the lower molecular weight poly(vinylamine).

EXAMPLE 6

In this example the high molecular weight vinylamine homopolymer demonstrated a surprisingly high viscosity in saturated brine solutions. This property is important in completion fluids used in oil wells.

The saturated salt solution was prepared by mixing 1 g of a polymer into 100 g of saturated salt solution and measuring the viscosity.

TABLE 4

| | Viscosity in Saturated Salt Solution (cps) | |
|---|---|---|
| Polymer | NaCl | CaCl$_2$ |
| VAm (0.6 MM) | 3 | 100 |
| VAm (7 MM) | 11.5 | 300 |
| Hercules 250 HHR Hydroxyethylcellulose | 4 | 250 |

EXAMPLE 7

The high molecular weight vinylamine polymer is evaluation in a Texas gas well with a producing interval of 6,280' to 6,340' at a bottom hole static temperature of 82° C. The formation permeability averages 0.15 millidarcy. With 2⅜ inch tubing the well productivity before treatment is 5,500 $ft^3$/day.

A fracture-acidizing fluid is prepared by diluting 3,000 gallons of 20% hydrochloric acid with 6,000 gallons of fresh water. To this mixture is added 800 gallons of the emulsion of Example 1 (1% polymer by weight). The fluid is injected into the well at 10 barrels/min. and at a pressure of 4,000 psi. The added fluid is allowed to react for 16 hours under pressure. When the pressure is relieved and the well is returned to a flowing status, the well productivity is found by testing to be significantly improved.

STATEMENT OF INDUSTRIAL APPLICATION

The present invention provides a method of enhancing the recovery of oil and gas from underground formations by the use of injection fluids which contain poly(N-vinylamides) hydrolyzable under conditions in the underground formation to poly(vinylamines) in quantities sufficient to produce viscosifying effects.

We claim:

1. A process for enhancing the recovery of oil or gas from a porous underground formation bearing oil or gas which comprises injecting into said formation an aqueous fluid containing from about 0.1 to 2 weight percent of substantially unhydrolyzed poly(N-vinylamide) having an average molecular weight of at least $10^6$, which is homopolymer or copolymer of monomers having the formula:

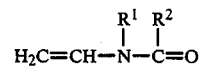

wherein $R^1$ and $R^2$ are each independently H or $C_1$-$C_4$ alkyl; and subjecting said poly-(N-vinylamide) within said formation to strongly acidic or strongly basic hydrolyzing conditions, thereby converting said poly(N-vinylamide) in situ to a viscosifying amount of poly(vinylamine) within said aqueous fluid.

2. The process of claim 1 wherein said poly(N-vinylamide) has an average molecular weight in the range of 1.3 to $15 \times 10^6$.

3. The process of claim 2 wherein said poly(n-vinylamide) has an average molecular weight in the range of 1.8 to $9 \times 10^6$.

4. The process of claim 1 wherein less than 10 percent of the amide moieties in the poly(N-vinylamide) are hydrolyzed to amine groups prior to injecting said fluid into said formation.

5. The process of claim 1 wherein said poly(N-vinylamide) is a homopolymer of N-vinylformamide, N-vinylacetamide or an N-substituted alkyl derivative of either amide.

6. The process of claim 1 wherein said strongly acidic conditions include a pH of about 2 or less and said strongly basic conditions include a pH of about 12 or more.

7. The process of claim 1 wherein said poly(N-vinylamide) has been prepared by inverse emulsion polymerization and the emulsion product of said polymerization is added to an acidic or basic water solution to form said aqueous fluid for injection into said formation.

8. The process of claim 1 wherein said poly(N-vinylamide) is less than 50 percent hydrolyzed to vinylamine units before entering said formation.

9. A process for enhancing the recovery of oil or gas from a porous underground formation bearing oil or gas which comprises mixing together an acidic or alkaline aqueous solution and a water-in-oil emulsion of at least $10^6$ average molecular weight poly(N-vinylamide) formed by polymerizing N-vinylamide in an inverse emulsion, thereby forming an injection fluid containing from about 0.1 to 2 weight percent of said poly(N-vinylamide); injecting said fluid into said formation; and subjecting said poly(N-vinylamide) within said formation to strongly acidic or strongly basic hydrolyzing conditions to convert said poly(N-vinylamide) to poly(vinylamine) in sufficient amount to produce a viscosifying effect.

10. The process of claim 9 wherein the concentration of acid or base in the injection fluid is from the stoichiometric amount required for complete hydrolysis of the polymer amide groups present up to about 30 weight percent of the aqueous solution.

11. The process of claim 10 wherein said poly(N-vinylamide) is poly(N-vinylformamide).

12. The process of claim 10 wherein said injection fluid is an alkaline flooding fluid.

13. The process of claim 10 wherein said injection fluid is an acidic flooding fluid.

14. The process of claim 10 wherein said injection fluid is a well completion fluid.

15. The process of claim 10 wherein said injection fluid is a well acidizing solution.

* * * * *